(12) United States Patent
Muza

(10) Patent No.: US 9,793,802 B2
(45) Date of Patent: Oct. 17, 2017

(54) MEMS CAPACITIVE SENSOR BIASING CIRCUIT INCLUDING AN INTEGRATED INDUCTOR

(75) Inventor: John M. Muza, Venetia, PA (US)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 13/110,360

(22) Filed: May 18, 2011

(65) Prior Publication Data
US 2012/0293216 A1    Nov. 22, 2012

(51) Int. Cl.
*H02M 3/158*    (2006.01)

(52) U.S. Cl.
CPC .................................. *H02M 3/158* (2013.01)

(58) Field of Classification Search
CPC ....... H01L 23/645; H02M 3/07; H02M 3/073; H02M 3/158
USPC .............................. 327/536, 537; 363/59, 60
See application file for complete search history.

(56) References Cited

U.S. PATENT DOCUMENTS

| | | | |
|---|---|---|---|
| 6,693,573 B1 | 2/2004 | Linder | |
| 7,081,739 B2 * | 7/2006 | Osinga et al. | 323/222 |
| 7,250,842 B1 | 7/2007 | Johnson et al. | |
| 7,486,002 B2 | 2/2009 | Pulskamp | |
| 7,676,922 B1 | 3/2010 | Hopper et al. | |
| 7,705,421 B1 | 4/2010 | Yegnashankaran | |
| 7,786,837 B2 | 8/2010 | Hebert | |
| 2008/0238599 A1 | 10/2008 | Hebert et al. | |
| 2009/0134503 A1 | 5/2009 | Feng et al. | |
| 2009/0256667 A1 | 10/2009 | Smeys et al. | |
| 2011/0018616 A1 * | 1/2011 | Li et al. | 327/536 |

FOREIGN PATENT DOCUMENTS

TW    201002608    1/2010

\* cited by examiner

*Primary Examiner* — Lincoln Donovan
*Assistant Examiner* — Colleen O Toole
(74) *Attorney, Agent, or Firm* — Michael Best & Friedrich LLP

(57) ABSTRACT

A MEMS capacitive sensor biasing circuit. The circuit includes a high-voltage (HV) NMOS switch, an inductor, a diode, and a capacitor. The HV NMOS switch has a source coupled to ground. The inductor has a first node coupled to a drain of the HV NMOS switch, and a second node coupled to a DC power source supplying a first DC voltage. The diode has an anode coupled to the first node of the inductor and the drain of the HV NMOS switch. The capacitor has a first node coupled to a cathode of the diode, and a second node coupled to the ground.

17 Claims, 1 Drawing Sheet

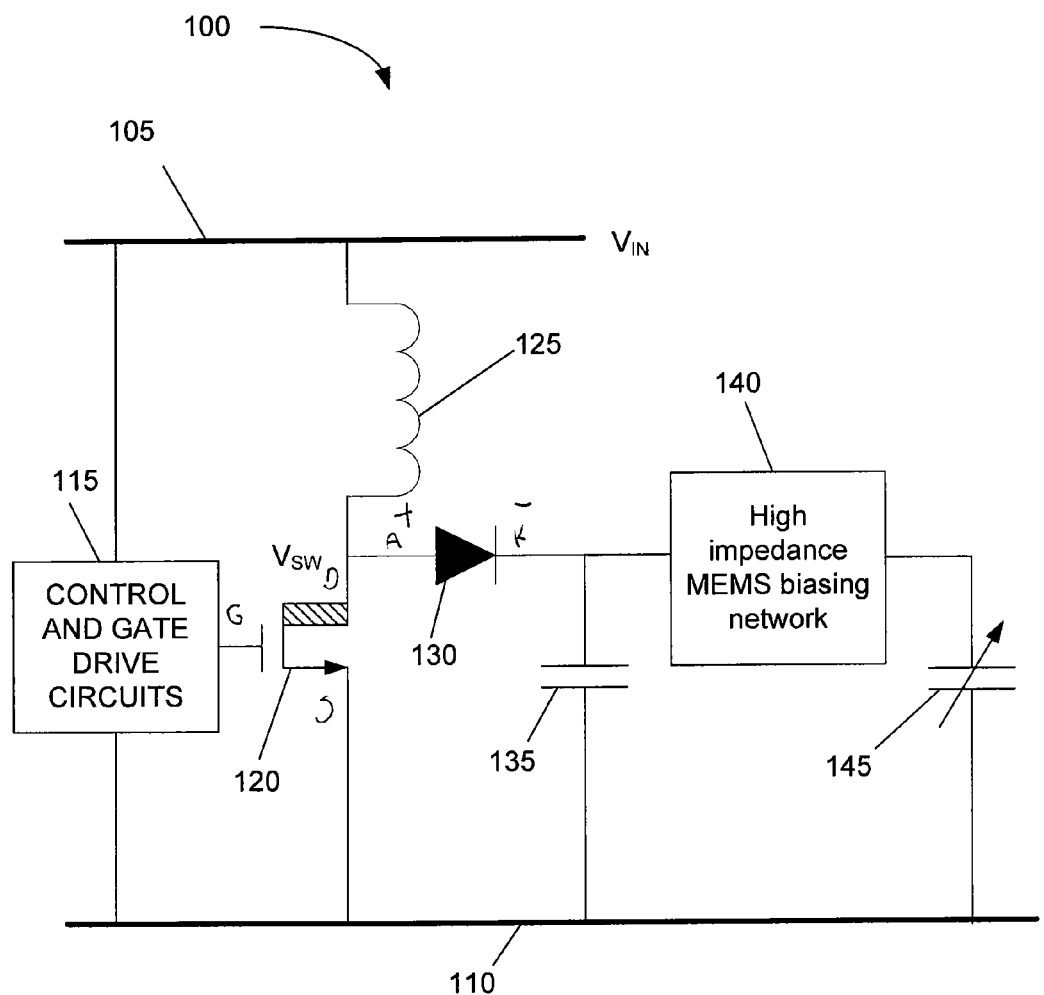

MEMS CAPACITIVE SENSOR BIASING CIRCUIT INCLUDING AN INTEGRATED INDUCTOR

BACKGROUND

The invention relates to a boost style DC/DC converter for biasing capacitive sensors of MEMS microphones, specifically a MEMS boost style DC/DC converter including an integrated inductor.

MEMS microphones use charge pumps to boost the bias voltage applied to a capacitive sensor above the power supply voltage. Charge pump designs cascade a series of pump blocks that build on the input voltage from a prior stage. Each stage's gain is limited to something less than the power supply's voltage, ideally a supply and temperature-independent reference voltage. For low-voltage designs that are required in the cell phone market, such as a 1.5 volt power source generating greater than 50 volts, a large number of stages are required. This results in higher current consumption because of parasitic capacitances generated by the charging and discharging of each stage. In addition, the large number of stages requires a large silicon foot print.

In addition, high-voltage charge pumps require high-voltage components or standard CMOS components placed in high-voltage isolation wells, both having relatively large space requirements. Also, because the capacitors need to tolerate high voltage, the capacitors are metal-metal capacitors. Metal-metal capacitors have relatively low density, which increases chip real estate requirements and cost.

SUMMARY

In one embodiment, the invention provides a MEMS capacitive sensor biasing circuit. The circuit includes a high-voltage (HV) NMOS switch, an inductor, a diode, and a capacitor. The HV NMOS switch has a source coupled to ground. The inductor has a first node coupled to a drain of the HV NMOS switch, and a second node coupled to a DC power source supplying a first DC voltage. The diode has an anode coupled to the first node of the inductor and the drain of the HV NMOS switch. The capacitor has a first node coupled to a cathode of the diode, and a second node coupled to the ground.

In another embodiment the invention provides a method of generating a bias voltage for a capacitive sensor by a MEMS circuit. The MEMS circuit includes a high-voltage (HV) NMOS switch having a source coupled to ground, an inductor having a first node coupled to a drain of the HV NMOS switch, and a second node coupled to a DC power source supplying a first DC voltage, a diode having a anode coupled to the first node of the inductor and the drain of the HV NMOS switch, and a capacitor having a first node coupled to a cathode of the diode, and a second node coupled to the ground. The method includes driving the HV NMOS switch closed, coupling the ground to the anode of the diode and the first node of the inductor, driving the HV NMOS switch open, causing a current to flow from the inductor through the diode to the capacitor, repeating the driving of the HV NMOS switch open and closed causing the capacitor to charge to a voltage greater than the first DC voltage, and charging the capacitor to a second DC voltage, the second DC voltage having a magnitude greater than the first DC voltage.

Other aspects of the invention will become apparent by consideration of the detailed description and accompanying drawings.

BRIEF DESCRIPTION OF THE DRAWINGS

FIG. 1 is a schematic/block diagram of a MEMS capacitive sensor biasing circuit incorporating an integrated inductor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 is a schematic/block diagram of a MEMS circuit 100 (e.g., a capacitive sensor biasing circuit). The circuit 100 includes a DC power source 105 (a positive DC voltage $V_{IN}$, i.e., a first DC voltage), a ground 110, a control and gate drive circuit 115, a high-voltage (HV) NMOS switch 120, an inductor 125, a diode 130, a capacitor 135, a high-impedance MEMS biasing network 140, and a capacitive sensor 145. In some embodiments, the control and gate drive circuit 115, the HV NMOS switch 120, the inductor 125, the diode 130, the capacitor 135, the high-impedance MEMS biasing network 140, and the capacitive sensor 145 all reside on a single MEMS chip. The control and gate drive circuit 115 controls the HV-NMOS switch 120, driving the gate of the HV-NMOS switch 120. The source of the HV-NMOS switch 120 is coupled to ground 110, and the drain of the HV-NMOS switch 120 is coupled to the anode of the diode 130 and a first node of the inductor 125 (at a node $V_{SW}$). A second node of the inductor 125 is coupled to the DC power source 105. The cathode of the diode 130 is coupled to a first node of the capacitor 135 and the high-impedance MEMS biasing network 140. The high-impedance MEMS biasing network 140 is also coupled to the capacitive sensor 145.

When the switch 120 is turned on (i.e., a conducting state), the node $V_{SW}$ is near ground potential, and current builds in the inductor 125. When the switch 120 is turned off (i.e., a non-conducting state), because the current in the inductor 125 cannot change instantly, the voltage level at node $V_{SW}$ elevates until the diode 130 conducts current onto the capacitor 135, charging the capacitor 135 to a higher potential. The control and gate drive circuit 115 cycles between driving the switch 120 in the conducting and non-conducting states. The capacitor 135 is charged until the voltage reaches an equilibrium level based on the duty cycle. The equilibrium voltage (EqVoltage, i.e., a second DC voltage) is approximately equal to the DC power supply voltage ($V_{IN}$) divided by one minus a duty cycle of the conducting state of the switch 120 (i.e., the percentage of time the switch 120 is on versus off):

$$\text{EqVoltage} = V_{IN}/(1-\text{Duty Cycle})$$

Thus, if the control and gate drive circuit 115 drives the switch 120 such that the switch 120 is on 75% of the time and off 25% of the time, the capacitor 135 will eventually charge to nearly four times the input voltage $V_{IN}$. Because of the nature of the integrated inductor 125, a high switching frequency (e.g., many kHz) is used. In addition, a large duty cycle is used to obtain large boost ratios.

The circuit 100 can achieve acceptable performance with an inductor 125 having a very small inductance value due to the low leakage levels of the circuit 100 load. Compared to prior-art designs, the circuit 100 reduces the number of high-voltage components from three to one, and does not use large high-voltage charge pump capacitors, reducing the necessary real estate. Designs using the circuit 100 are also less complicated, and can be created in shorted time periods with a reduced risk of failure. In addition, adjusting the output voltage level using duty-cycle control in a low-voltage domain simplifies the programming of the circuit 100 versus the prior art. Thus, large increases in bias voltage can be obtained with relatively small chip real estate requirements, with simplified designs requirements, and with simplified programming.

Various features and advantages of the invention are set forth in the following claims.

What is claimed is:

1. A MEMS chip, the chip comprising:
   a high-voltage (HV) NMOS switch having a source coupled to ground;
   an inductor having a first node coupled to a drain of the HV NMOS switch, and a second node coupled to a DC power source supplying a first DC voltage, the inductor integrally formed as part of the MEMS chip;
   a diode having an anode coupled to the first node of the inductor and the drain of the HV NMOS switch; and
   a capacitor having a first node coupled to a cathode of the diode, and a second node coupled to the ground;
   wherein the MEMS chip is a capacitive sensor biasing circuit.

2. The chip of claim 1, further comprising a high-impedance MEMS biasing network coupled to the first node of the capacitor and the cathode of the diode.

3. The chip of claim 2, further comprising a capacitive sensor coupled between an output of the high-impedance MEMS biasing network and the ground.

4. The chip of claim 3, wherein a bias voltage is applied to the capacitive sensor, the bias voltage having a magnitude that exceeds the first DC voltage.

5. The chip of claim 3, further comprising a control and gate drive circuit coupled to a gate of the HV NMOS switch.

6. The chip of claim 5, wherein the control and gate drive circuit drives the gate of the HV NMOS switch to cycle the HV NMOS switch between a conducting state and a non-conducting state.

7. The chip of claim 6, wherein the cycling of the HV NMOS switch has a duty cycle equal to a proportion of a time the HV NMOS switch is in the conducting state versus the non-conducting state.

8. The chip of claim 7, wherein the capacitor is charged to a second DC voltage approximately equal to the first DC voltage divided by one minus the duty cycle.

9. The chip of claim 8, wherein the second DC voltage is applied as a bias voltage to the capacitive sensor by the high-impedance MEMS biasing network.

10. A method of generating a bias voltage for a capacitive sensor by a MEMS chip including a high-voltage (HV) NMOS switch having a source coupled to ground, an inductor integrally formed as part of the MEMS chip and having a first node coupled to a drain of the HV NMOS switch, and a second node coupled to a DC power source supplying a first DC voltage, a diode having a anode coupled to the first node of the inductor and the drain of the HV NMOS switch, and a capacitor having a first node coupled to a cathode of the diode, and a second node coupled to the ground, the HV NMOS switch, the method comprising:
   driving the HV NMOS switch closed, coupling the ground to the anode of the diode and the first node of the inductor;
   driving the HV NMOS switch open, causing a current to flow from the inductor through the diode to the capacitor;
   repeating the driving of the HV NMOS switch open and closed causing the capacitor to charge to a voltage greater than the first DC voltage; and
   charging the capacitor to a second DC voltage, the second DC voltage having a magnitude greater than the first DC voltage.

11. The method of claim 10, further comprising providing the second DC voltage to a high-impedance MEMS biasing network.

12. The method of claim 11, further comprising biasing the capacitive sensor to the second DC voltage.

13. The method of claim 10, wherein a control and gate drive circuit drives a gate of the HV NMOS switch.

14. The method of claim 10, wherein the repeating of the driving of the HV NMOS switch has a duty cycle equal to a proportion of a time the HV NMOS switch is closed versus open.

15. The method of claim 14, wherein the second DC voltage is approximately equal to the first DC voltage divided by one minus the duty cycle.

16. The circuit of claim 1, wherein the only high-voltage component is an HV-NMOS switch.

17. The circuit of claim 1, wherein the circuit does not include a high-voltage charge pump capacitor.

* * * * *